(12) United States Patent
Lee

(10) Patent No.: US 9,007,455 B2
(45) Date of Patent: Apr. 14, 2015

(54) IMAGE RECORDING SYSTEM FOR VEHICLE AND REFLECTION UNIT

(75) Inventor: Jae Hoon Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 381 days.

(21) Appl. No.: 13/437,515

(22) Filed: Apr. 2, 2012

(65) Prior Publication Data

US 2012/0274769 A1  Nov. 1, 2012

(30) Foreign Application Priority Data

Apr. 29, 2011 (KR) .................. 10-2011-0040483

(51) Int. Cl.
*H04N 7/18* (2006.01)
*G07C 5/08* (2006.01)
*B60R 1/08* (2006.01)

(52) U.S. Cl.
CPC ............... *G07C 5/0866* (2013.01); *B60R 1/08* (2013.01)

(58) Field of Classification Search
CPC .......... G07C 5/0866; B60R 2011/004; B60R 2011/0082; B60R 2011/0094; B60R 1/00–1/105; G02F 1/00–1/397; G02B 7/182
USPC ............................................. 348/148, E7.085
See application file for complete search history.

(56) References Cited

U.S. PATENT DOCUMENTS

| | | | | |
|---|---|---|---|---|
| 2,938,422 A * | 5/1960 | Hardy | .............................. | 356/250 |
| 3,532,409 A * | 10/1970 | Humphrey | ..................... | 359/555 |
| 3,711,178 A * | 1/1973 | Humphrey | ..................... | 359/555 |
| 3,729,266 A * | 4/1973 | Mason et al. | .................. | 356/250 |
| 3,761,158 A * | 9/1973 | Humphrey | ..................... | 359/555 |
| 3,824,000 A * | 7/1974 | Burns | ........................... | 359/503 |
| 3,944,325 A * | 3/1976 | Humphrey | ..................... | 359/555 |
| 4,161,942 A * | 7/1979 | Monk | ............................ | 126/576 |
| 5,425,108 A * | 6/1995 | Hwang et al. | ................. | 382/105 |
| 5,654,549 A * | 8/1997 | Landecker et al. | ........... | 250/332 |
| 5,670,953 A * | 9/1997 | Satoh et al. | .................... | 340/903 |
| 6,014,522 A * | 1/2000 | Reber, II | .......................... | 396/29 |
| 6,352,208 B1* | 3/2002 | Shibata et al. | ................. | 237/2 A |
| 7,542,200 B1* | 6/2009 | Stowe | ............................. | 359/291 |
| 7,729,507 B1* | 6/2010 | Malachowsky | ............... | 382/100 |
| 2003/0075955 A1* | 4/2003 | Tiesler et al. | .................. | 296/214 |
| 2003/0214738 A1* | 11/2003 | Yamada et al. | ............... | 359/877 |
| 2005/0168695 A1* | 8/2005 | Ooba et al. | ...................... | 353/13 |
| 2007/0188895 A1* | 8/2007 | Thiel | .............................. | 359/841 |
| 2008/0073947 A1* | 3/2008 | Hagler-Gray et al. | ... | 297/180.14 |
| 2010/0066832 A1* | 3/2010 | Nagahara et al. | ............. | 348/148 |
| 2011/0029185 A1* | 2/2011 | Aoki et al. | ....................... | 701/29 |
| 2012/0120404 A1* | 5/2012 | Coffin | ........................... | 356/452 |
| 2012/0127252 A1* | 5/2012 | Lim et al. | ....................... | 347/118 |
| 2013/0016219 A1* | 1/2013 | Hahner et al. | ................ | 348/148 |

FOREIGN PATENT DOCUMENTS

| | | | |
|---|---|---|---|
| JP | 11208377 A | * | 8/1999 |
| JP | 2004276733 A | * | 10/2004 |

(Continued)

*Primary Examiner* — Geepy Pe
*Assistant Examiner* — Matthew J Anderson

(57) ABSTRACT

There are provided an image recording system for a vehicle and a reflection unit thereof. The image recording system includes a vehicle in which a storage space is provided, a camera that is installed in the storage space, and a reflection unit that is installed on a window or a ceiling of the vehicle to reflect image information from a forward or rearward direction of the vehicle into the camera.

14 Claims, 7 Drawing Sheets

(56) References Cited

FOREIGN PATENT DOCUMENTS

| JP | 2007-50749 | 3/2007 |
| JP | 2007313950 A | * 12/2007 |
| JP | 2010042703 A | * 2/2010 |
| KR | 1998-022402 | 7/1998 |
| WO | WO 2006104317 A1 | * 10/2006 |

* cited by examiner

A-A

B-B

C-C

D-D

IMAGE RECORDING SYSTEM FOR VEHICLE AND REFLECTION UNIT

CROSS-REFERENCE TO RELATED APPLICATIONS

This application claims the priority of Korean Patent Application No. 10-2011-0040483 filed on Apr. 29, 2011, in the Korean Intellectual Property Office, the disclosure of which is incorporated herein by reference.

BACKGROUND OF THE INVENTION

1. Field of the Invention

The present invention relates to an image recording system for a vehicle and a reflection unit, and more particularly, to an image recording system for a vehicle, which is installed in a vehicle or the like to photograph and store information regarding traffic conditions and accident details from a forward or rearward direction, and a reflection unit used therein.

2. Description of the Related Art

As a method of finding an exact cause of a traffic accident, a method of installing a monitoring device such as a camera behind a windshield of a vehicle has widely been used.

The monitoring device is mounted behind the windshield of a vehicle in order to monitor a forward view widely and clearly.

However, the windshield may easily be broken by a shock when an accident happens and a monitoring device may be greatly affected by direct sunlight, thereby causing damage thereto and an overheating phenomenon therein.

Therefore, there is demand for a monitoring device having a configuration that is less affected by external shocks and direct sunlight.

In addition, there is a demand for a monitoring device for a forward direction that can easily adjust a video recording direction according to driver's focus of vision or a vehicle's direction of movement.

SUMMARY OF THE INVENTION

An aspect of the present invention provides an image recording system for a vehicle, which is capable of preventing a camera from being damaged by a shock and also preventing a deterioration in a performance of the camera or a reduction in the lifespan thereof due to direct sunlight, and a reflection unit mounted therein.

According to an aspect of the present invention, there is provided an image recording system for a vehicle, including: a vehicle having a storage space therein, a camera installed in the storage space, and a reflection unit installed on a window or a ceiling of the vehicle to reflect image information from a forward or rearward direction of the vehicle into the camera.

The image recording system may further include a shock absorbing unit installed in the storage space to protect the camera from an external shock.

The shock absorbing unit may include: a camera housing, housing the camera, and a filling member filling the camera housing.

The filling member may be foam resin, styrofoam, or sponge.

The reflection unit may be installed on a rearview mirror provided in the vehicle.

The reflection unit may include: a reflection member that reflects the image information from the forward direction of the vehicle into the camera, and a working fluid that inclines the reflection member in a rotation direction of the vehicle due to centrifugal force generated when the vehicle turns or rotates on a curved road.

The working fluid may be a viscous fluid that consists of water, oil, a mixture fluid of water and oil, a polymer solution, or a colloidal dispersion fluid.

The reflection unit may include a reflection member having a plurality of surfaces or a curved reflection member.

The storage space may be provided between the ceiling and a roof of the vehicle.

The image recording system may further include a ventilation unit that is installed in the storage space to circulate internal air in the vehicle toward the storage space.

According to another aspect of the present invention, there is provided a reflection unit including: a reflection member reflecting image information from a forward direction of a vehicle into a camera, and a working fluid inclining the reflection member in a rotation direction of the vehicle due to centrifugal force generated when the vehicle turns or rotates on a curved road.

The working fluid may be a viscous fluid that consists of water, oil, a mixture fluid of water and oil, a polymer solution, or a colloidal dispersion fluid.

The reflection member may include a plurality of surfaces or a curved surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to appropriately describe the method he or she knows for carrying out the invention.

In the present specification and the drawings, an image recording system for a vehicle of the present invention is explained and illustrated as monitoring a forward direction from a vehicle. However, this is merely an example and the image recording system for the vehicle may be also be used to monitor rearward or side directions from a vehicle, if necessary.

First Embodiment

Figure 1:
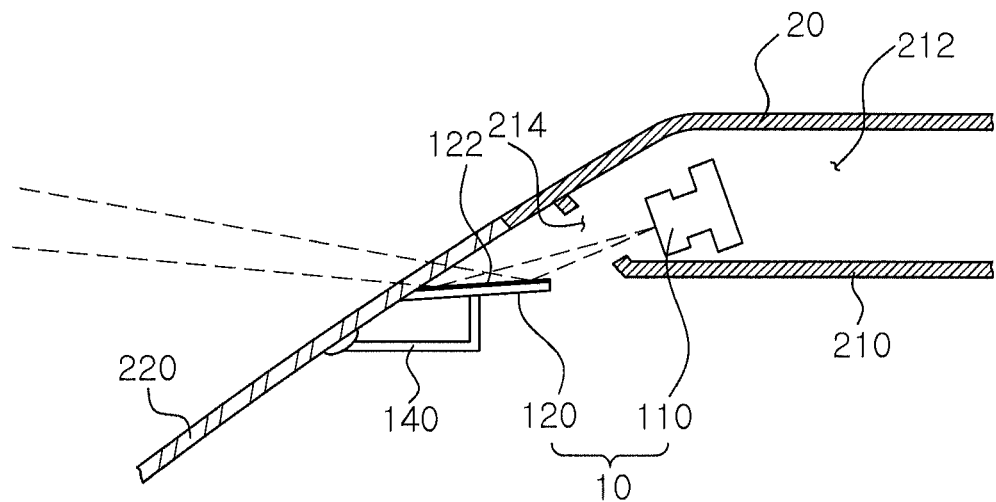
FIG. 1 is a view of an image recording system for a vehicle according to a first embodiment of the invention.

FIG. 1 is a view of an image recording system for a vehicle according to a first embodiment of the invention.

An image recording system for a vehicle 10 according to the first embodiment may include a camera 110 and a reflection unit 120.

The camera 110 may be installed on a ceiling 210 of a vehicle 20. Alternatively, the camera 110 may be installed in an inner space 212 of the ceiling 210 to be protected from an external shock applied to the vehicle 20 and also not to disturb a driver or a passenger riding in the vehicle 20. In order to install the camera 110 inside the ceiling 210, the inner space 212 provided between the ceiling 210 and a roof may be used as it is, but a separate space may be formed in the ceiling 210, if necessary. For reference, the ceiling 210 has a hole 214 formed therein to allow light reflected from a subject to enter a lens of the camera 110.

The camera 110 may have a function of continuously video recording and storing an image entering through a windshield 220, when the vehicle 20 is running or stopped. In addition, the camera 110 may have daytime photographing mode and a nighttime photographing mode functions. For example, in the daytime photographing mode, an infrared ray (IR) blocking filter may be used to block infrared rays. In the nighttime photographing mode, a visible ray blocking filter may be used to perform video recording by using infrared rays. The shape and function of the camera 110 may be modified to any other shape and any other function within a range that can be recognized by an ordinarily skilled person in the related art.

The reflection unit 120 may be installed on the windshield 220 of the vehicle 20 or the ceiling 210. The reflection unit 120 includes a reflection member 122 and is fixed in place by a support member 140. The reflection member 122 reflects image information unfolding ahead of the vehicle 20 into the camera 110.

The reflection unit 120 may have a configuration capable of adjusting an angle of reflection of the reflection member 122 according to a user's requirements. For example, the reflection unit 120 may be installed on the support member 140 by means of a ball joint (not shown).

As described above, since the relatively expensive camera 110 of the image recording system 10 for the vehicle is installed on the ceiling 210 of the vehicle 20, the camera 110 can be more safely protected from a shock applied to the front and side of the vehicle.

In addition, according to the present embodiment, since the camera 110 is not directly exposed to direct sunlight, an internal temperature of the camera 110 rapidly increased due to the direct sunlight may be prevented, even if the vehicle 20 is exposed to direct sunlight for an extended period of time.

Second Embodiment

Figure 2:
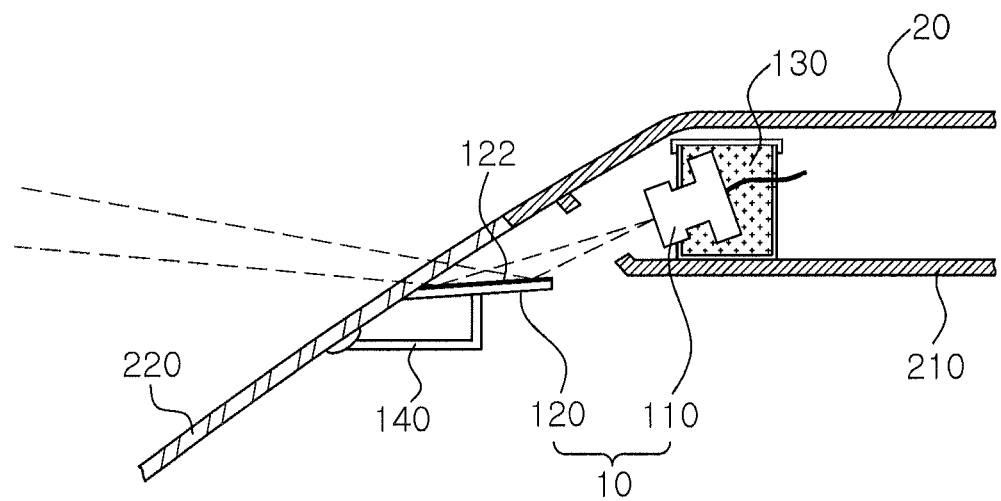
FIG. 2 is a view of an image recording system for a vehicle according to a second embodiment of the invention.
Figure 3:
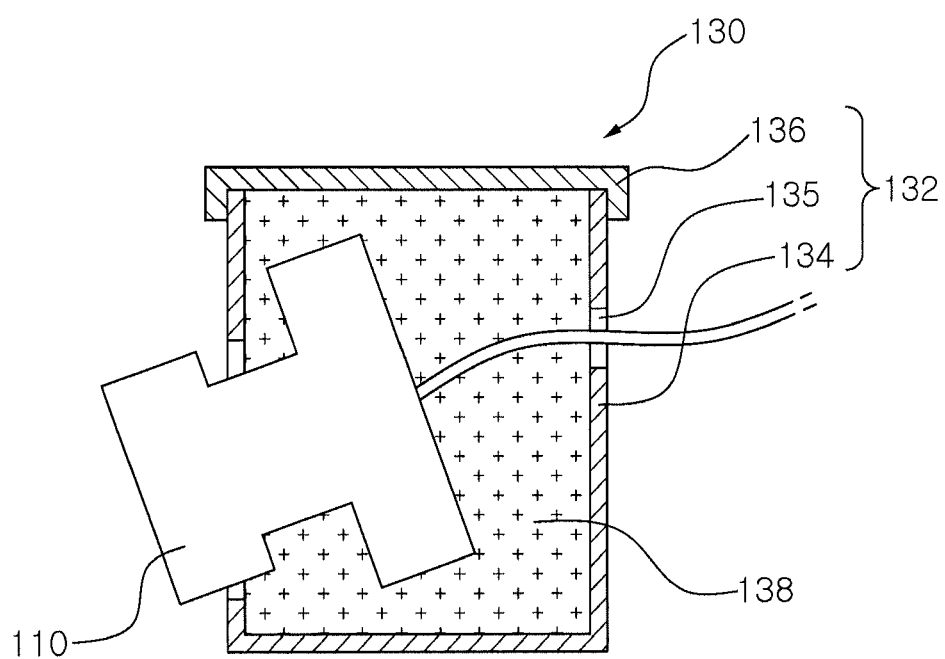
FIG. 3 is a cross-sectional view of a shock absorbing unit illustrated in FIG. 2.

FIG. 2 is a view of an image recording system for a vehicle according to a second embodiment of the invention, and FIG. 3 is a cross-sectional view of a shock absorbing unit of the camera of FIG. 2. For reference, in the second embodiment, the same elements as those of the first embodiments are assigned the same reference numerals and a detailed description thereof is omitted.

According to the second embodiment, the image recording system 10 for a vehicle may further include a shock absorbing unit 130.

The shock absorbing unit 130 may be installed in the ceiling 210 of the vehicle 20 like the camera 110 and prevent a shock applied to the vehicle 20 from being directly transmitted to the camera 110. In the present embodiment, the shock absorbing unit 130 may include a camera housing 132 and a filling member 138 as shown in FIG. 3.

The camera housing 132 may include a camera housing body 134 to house the camera 110 and a camera housing cover 136. The camera housing body 134 has an upper portion (with reference to FIG. 3) opened to allow the camera 110 to be installed therein and also has a front portion (with reference to FIG. 3) opened to allow a part of the camera 110 (a lens part) to be exposed therethrough. The camera housing body 134 has an opening 135 formed in one surface thereof to allow a wire connected to the camera 110 to be drawn out therefrom. The camera housing cover 136 covers the upper portion of the camera housing body 134. The camera housing cover 136 prevents the camera 110 from being separated from the camera housing body 134.

The filling member 138 fills an inner space of the camera housing 132 in a state in which the camera 110 is installed in the camera housing 132. The filling member 138 may be injected into the camera housing 132 through the opened surface or the opening 135 of the camera housing body 134. Such a filling member 138 may prevent the camera 110 from being involuntarily moved in the inner space of the camera housing 132, and may protect the camera 110 from shocks applied to the camera housing 132.

For reference, the filling member 138 may be modified and applied to any other member or in any other shape in which it is formed of a material capable of absorbing an external shock, such as foam resin, styrofoam, sponge, or the like.

In the above-described embodiment, since the camera 110 is installed in the ceiling 210 by means of the shock absorbing unit 130, the camera 110 can be protected from not only a shock applied to the front and the side of the vehicle 20 but also a shock applied to the ceiling 210 of the vehicle 20.

Third Embodiment

Figure 4:
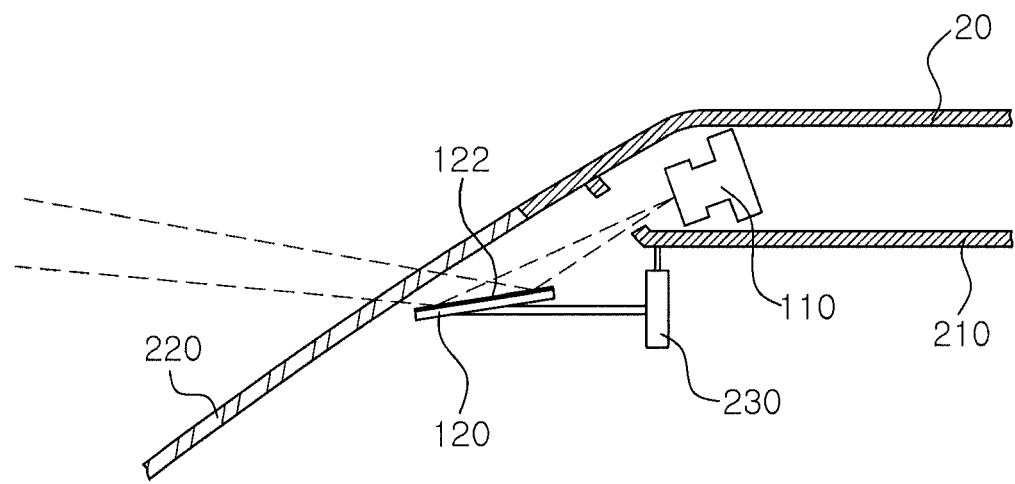
FIG. 4 is a view of an image recording system for a vehicle according to a third embodiment of the invention.

FIG. 4 is a view of an image recording system for a vehicle according to a third embodiment of the invention. For reference, in the third embodiment, the same elements as those of the first embodiment are assigned the same reference numerals and a detailed description thereof is omitted.

The image recording system 10 for the vehicle according to the third embodiment differs from those of the aforementioned embodiments in the installation shape of the reflection unit 120.

In the present embodiment, the reflection unit 120 may be installed on a rearview mirror 230 provided inside the vehicle 20. More specifically, the reflection unit 120 or the reflection member 122 may be installed on a forward surface of the rearview mirror 230 and reflect image information entering through the windshield 220 into the camera 110.

In the above-mentioned configuration according to the present embodiment, since a separate support member 140 for fixing the reflection unit 120 is not required, a manufacturing cost of the image recording system 10 for the vehicle can be reduced and it is easy to install the reflection unit 120.

Fourth Embodiment

Figure 5:
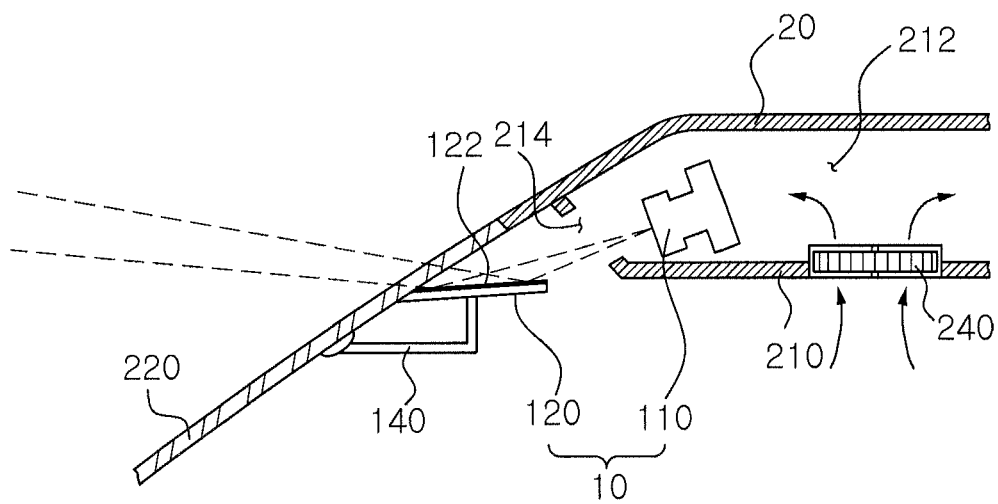
FIG. 5 is a view of an image recording system for a vehicle according to a fourth embodiment of the invention.

FIG. 5 is a view of an image recording system for a vehicle according to a fourth embodiment of the invention. For reference, in the fourth embodiment, the same elements as those of the first embodiment are assigned the same reference numerals and a detailed description thereof is omitted.

The image recording system 10 for the vehicle according to the fourth embodiment may further include a ventilation unit 240.

It is normal that the ceiling 210 of the vehicle 20 is covered with an insulating material in order to prevent direct sunlight and external heat or cold from flowing into the vehicle. However, if the vehicle 20 is parked in an outdoor parking lot for a long time or is running for a long time while sunlight is strong in high summer or autumn, thermal energy from the direct sunlight is concentrated on the ceiling 210 of the vehicle 20 and thus, a temperature in the inner space 212 of the ceiling 210 may be greatly increased.

However, the inside of the vehicle 20 may be maintained at a lower temperature as compared to the inner space 212 of the ceiling 210, since the driver may operate an air conditioner to maintain passenger comfort in the vehicle.

Considering the above point, the present embodiment provides the ventilation unit 240 in the ceiling 210. The ventilation unit 240 may be installed in the ceiling 210 and circulate air so that air from the vehicle 20 flows into the inner space 212 of the ceiling 210. The ventilation unit 240 may be formed to have a fan shape to cause forced circulation of air or to have a simple vent shape to permit the natural thermal convection of air.

In the present embodiment described above, since relatively low temperature air continuously flows into the inner space 212 of the ceiling 210, the camera 110 can be prevented from breaking down and being deteriorated due to a high temperature.

Fifth Embodiment

Figure 6:
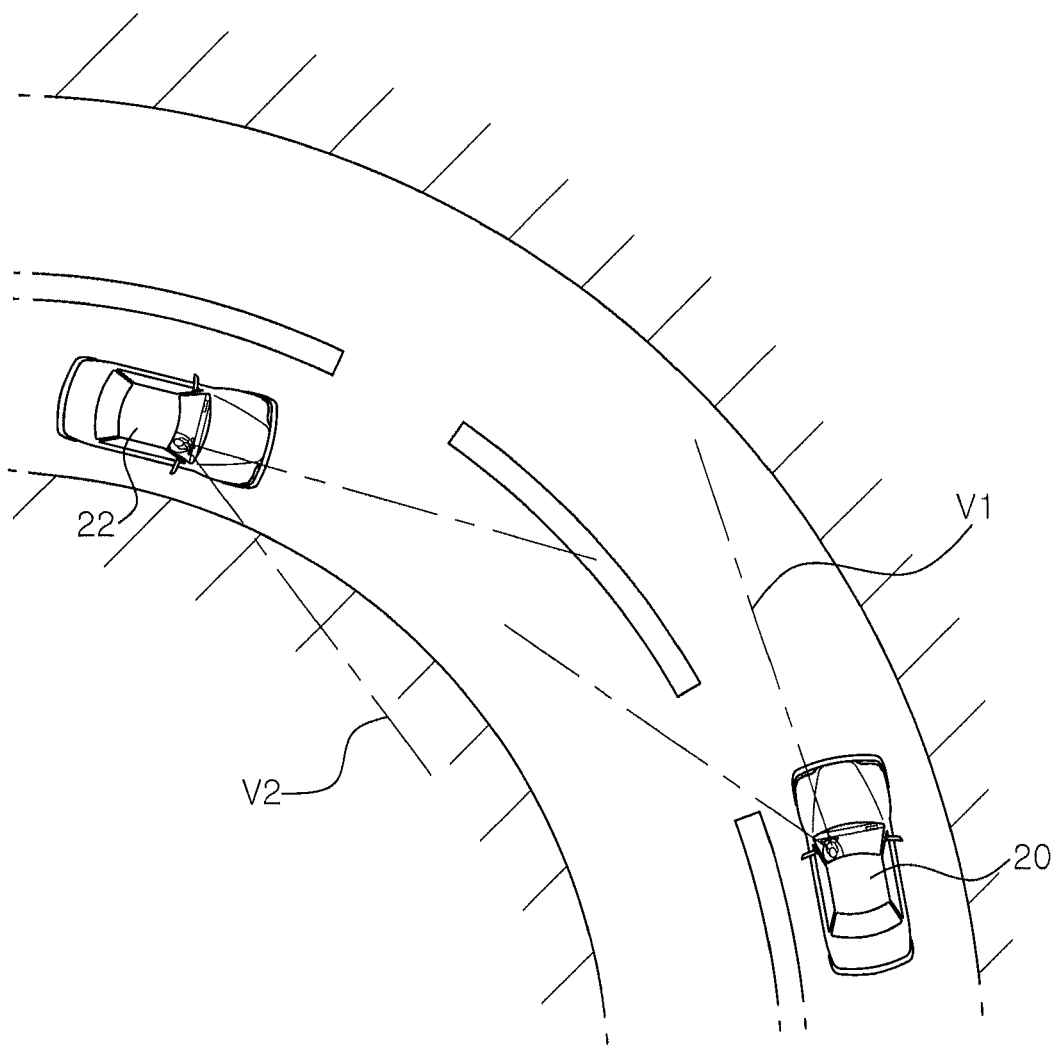
FIG. 6 is a view to explain a driver's focus of vision while driving on a curving road.
Figure 7:
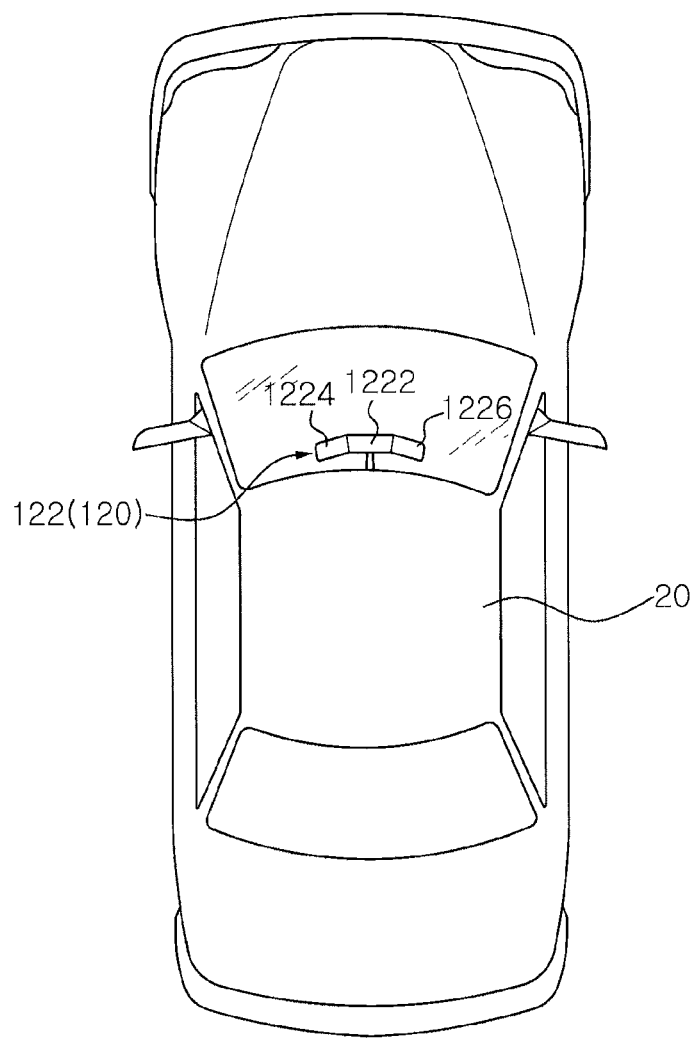
FIG. 7 is a view of one embodiment of the reflection unit which is suitable for driving on a curving road, and a vehicle employing the same.
Figure 8:
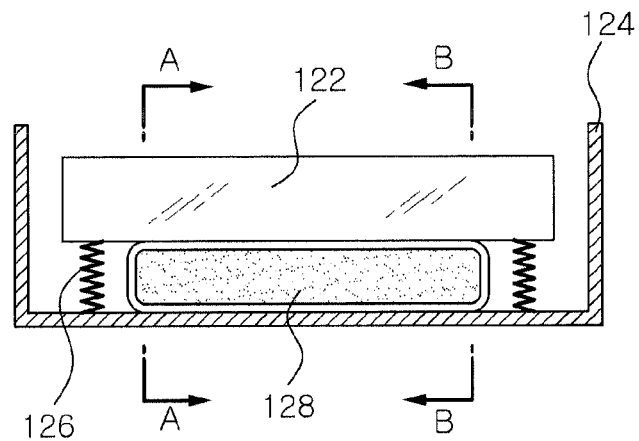
FIGS. 8 through 13 are views to explain another embodiment of the reflection unit which is suitable for driving on a curving road, and a principle thereof.
Figure 9:
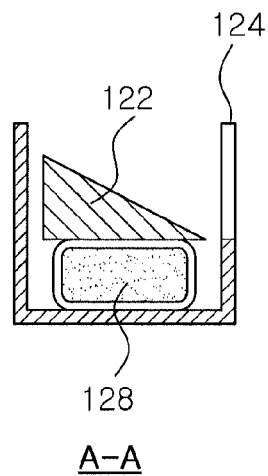
Figure 10:
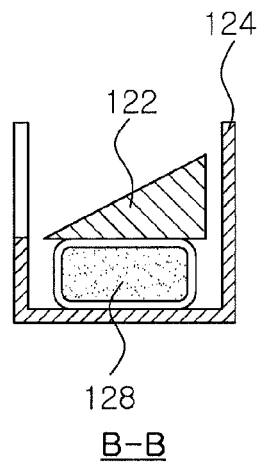
Figure 11:
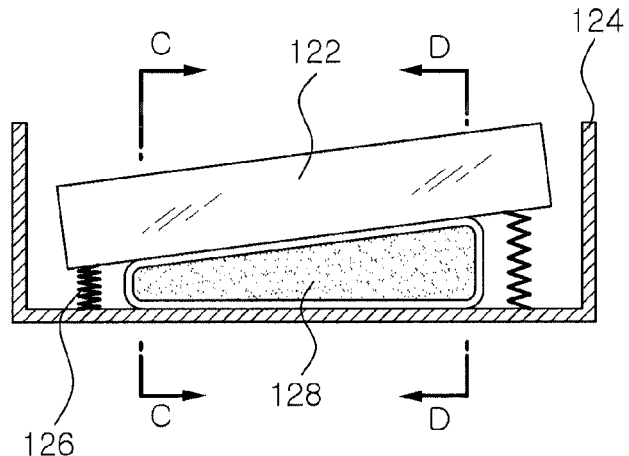
Figure 12:
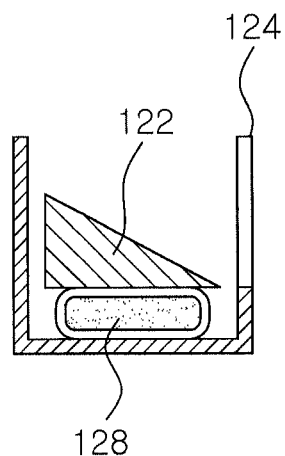
Figure 13:
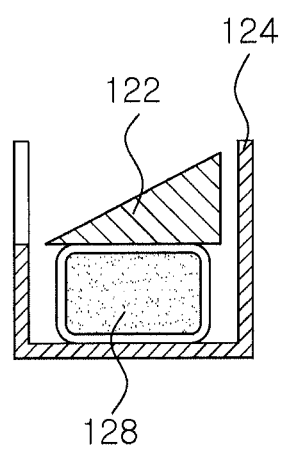

FIG. 6 is a view to explain a driver's focus of vision while driving on a curving road, FIG. 7 is a view illustrating one embodiment of the reflection unit suitable for driving on a curving road and a vehicle employing the same, and FIGS. 8 through 13 are views to explain another embodiment of the reflection unit suitable for driving on a curving road and a principle thereof. FIG. 9 is a cross-sectional view of FIG. 8 taken along line A-A, FIG. 10 is a cross-sectional view of FIG. 8 taken along line B-B, FIG. 12 is a cross-sectional view of FIG. 11 taken along line C-C, and FIG. 13 is a cross-sectional view of FIG. 11 taken along line D-D.

Since it may be difficult for the driver in a vehicle 22 to recognize the presence of an on-coming vehicle 20 on a curving road with a tight curve due to geographical features as shown in FIG. 6, a car crash frequently occurs. As such, drivers driving on the curving road keep their focuses of vision (V1, V2) in directions in which the on-coming vehicle 20, 22 is expected to come from in order to avoid a car crash with the on-coming vehicle.

Accordingly, in the case that a vehicle 20, 22 drives on a curving road, it is required to obtain image information from the direction in which the car crash between the vehicles may be expected.

In the present embodiment, in considering this point, two types of reflection units 120 are provided as follows:
(First Embodiment of the Reflection Unit)

According to the first embodiment of the reflection unit 120, the reflection unit 120 may include a reflection member 122 having a plurality of specular surfaces as shown in FIG. 7. In other words, the reflection member 122 may include a first specular surface 1222, a second specular surface 1224, and a third specular surface 1226.

The first specular surface 1222 reflects image information from a a center forward direction from the vehicle, the second specular surface 1224 reflects image information from a center left direction from the front of the vehicle, and the third specular surface 1226 reflects image information a center right direction from the front of the vehicle.

Since the reflection member 122 as described above may reflect a relatively wide range of image information into the camera 110 as compared to a reflection member having a single specular surface, image information including the driver's focus of vision V1, V2 may be stored in the camera 110.

In other words, if the reflection member 122 according to the present embodiment is used, all image information reflected through the specular surfaces 1222, 1224, and 1226 may enter the camera 110 and may be stored therein.

For reference, although the reflection member 122 includes the plurality of specular surfaces in FIG. 7, the reflection member 122 may have a curved specular surface, if necessary.
(Second Embodiment of the Reflection Unit)

According to the second embodiment of the reflection unit 120, the reflection unit 120 may include a reflection member 122, a housing 124, an elastic member 126, and a working fluid 128 as shown in FIG. 8.

The reflection member 122 may be formed in a column shape with a substantially triangular cross-section and may have a specular surface formed on an inclined surface. The reflection member 122 may be disposed in the housing 124.

The housing 124 houses the reflection member 122. The housing 124 may have a transparent surface opposite the specular surface of the reflection member 122 so as to allow image information to enter the specular surface of the reflection member 122, or the entire housing 124 may be formed of a transparent material. The housing 124 as formed above may be fixed to the windshield 220 or the ceiling 210 through the support member 140 shown in FIG. 1.

The elastic member 126 may connect the reflection member 122 and the housing 124. Also, the elastic member 126 maintains the reflection member 122 at a predetermined height above a bottom of the housing 124 in a horizontal state. Two elastic members 126 may be disposed at opposite ends of the reflection member 122.

The working fluid 128 in the present embodiment refers to a liquid that is free to be deformed by centrifugal force when the vehicle is running. For example, the working fluid 128 may be a viscous fluid consisting of water, oil, a mixture of water and oil, a polymer solution, or a colloidal dispersion fluid. The working fluid 128 may be sealed by a sealing bag so as not to leak into the outside of the housing 124 and is then installed in the housing 124. The working fluid 128 may be disposed under the reflection member 122 and may support the reflection member 122 at a predetermined height. Since the working fluid 128 is a liquid that is free to move, the working fluid 128 may move to the left or the right (with reference to FIGS. 8 and 11) of the housing 124 according to a turning direction of a vehicle.

An operational principle of the reflection unit 120 described above will be explained below with reference to FIGS. 11 through 13.

A rotating object has centrifugal force applied thereto so that it tends to move away from a center. Accordingly, if a vehicle abruptly turns, the working fluid 128 of the housing 124 moves to one side (opposite to the turning direction) due to centrifugal force as shown in FIG. 11.

Then, since the distribution of the working fluid 128 disposed under the reflection member 122 becomes non-uniform, the reflection member 122 is inclined to one side by the working fluid 128. A direction in which the reflection member 122 is inclined may be identical to a direction in which a car crash frequently happens on a curved road.

The inclination of the reflection member 122 may be increased or decreased according to a driving speed of a vehicle and a size of curve in a curving road. For example, when the vehicle 20, 22 turns on the curving road at high speed, the inclination of the working fluid 128 is greater than when a vehicle 20 turns at low speed. Also, when a vehicle is driven on a curving road with tight curves, the inclination of the working fluid 128 is greater than when the vehicle 20, 22 is driven on a curving road with gradual curves.

According to the second embodiment of the reflection member described above, since a front video recoding position of the vehicle may be automatically adjusted by the reflection member 122 according to an advancing state of the vehicle 20, a crash situation on the curved road can be photographed by the camera 110 more exactly and efficiently.

Also, in the second embodiment of the reflection member, a relatively narrow area may be photographed, unlike in the case of the first embodiment in which a wide area is photographed. Thus, a size of a video file stored in the camera 110 may be reduced.

Accordingly, the camera according to the present embodiment may store much longer video files using the same storage capacity as the related art.

As set forth above, according to embodiments of the present invention, since the camera is installed in the ceiling of the vehicle which receives less external shock, damage to the camera caused by a rear-end collision or a car crash and corresponding costs for repair of the camera may be significantly reduced.

Also, since the photographing direction of the camera is automatically changed according to the advancing direction of the vehicle, an accident condition happening in the forward direction from the vehicle may be monitored more exactly.

While the present invention has been shown and described in connection with the embodiments, it will be apparent to those skilled in the art that modifications and variations can be made without departing from the spirit and scope of the invention as defined by the appended claims.

What is claimed is:

1. An image recording system for a vehicle, comprising:
   the vehicle having a storage space therein;
   a camera installed in the storage space; and
   a reflection unit installed on a window or a ceiling of the vehicle to reflect image information from a forward direction or a rearward direction of the vehicle into the camera,
   wherein the reflection unit includes:
   a reflection member reflecting image information from the forward direction or the rearward direction of the vehicle into the camera,
   an elastic member connected to the reflection member and maintaining the reflection member in a horizontal state, and
   a working fluid inclining the reflection member in a rotation direction of the vehicle due to centrifugal force generated when the vehicle turns or rotates on a curved road.

2. The image recording system of claim 1, further comprising a shock absorbing unit installed in the storage space to protect the camera from an external shock.

3. The image recording system of claim 2, wherein the shock absorbing unit includes:
   a camera housing, housing the camera; and
   a filling member filling the camera housing.

4. The image recording system of claim 3, wherein the filling member is foam resin, styrofoam, or sponge.

5. The image recording system of claim 1, wherein the reflection unit is installed on a rearview mirror provided in the vehicle.

6. The image recording system of claim 1, wherein the working fluid is a viscous fluid that consists of water, oil, a mixture fluid of water and oil, a polymer solution, or a colloidal dispersion fluid.

7. The image recording system of claim 1, wherein the reflection unit includes the reflection member having a plurality of surfaces or a curved reflection member.

8. The image recording system of claim 1, wherein the storage space is provided between the ceiling and a roof of the vehicle.

9. The image recording system of claim 1, further comprising a ventilation unit that is installed in the storage space to circulate internal air in the vehicle toward the storage space.

10. A reflection unit comprising:
    a reflection member reflecting image information from a forward direction or a rearward direction of a vehicle into a camera;
    an elastic member connected to the reflection member and maintaining the reflection member in a horizontal state; and
    a working fluid inclining the reflection member in a rotation direction of the vehicle due to centrifugal force generated when the vehicle turns or rotates on a curved road.

11. The reflection unit of claim 10, wherein the working fluid is a viscous fluid that consists of water, oil, a mixture fluid of water and oil, a polymer solution, or a colloidal dispersion fluid.

12. The reflection unit of claim 10, wherein the reflection member includes a plurality of surfaces or a curved surface.

13. The image recording system of claim 1,
    wherein the elastic member includes two elastic members, and
    wherein the working fluid is contained in a sealing bag that is separate from the two elastic members.

14. The image recording system of claim 1,
    wherein the rotation direction of the reflection member, which is inclined by the working fluid, is in a right or left direction of a horizontal plane in response to the centrifugal force generated when the vehicle turns, and
    wherein the maintaining of the reflection member in the horizontal state maintains the reflection member in a vertical plane.

* * * * *